May 3, 1932.  R. H. WHITELEY  1,856,304

SELF LUBRICATING BEARING

Filed Jan. 14, 1929

Inventor
Robert H. Whiteley
By Williams, Bradbury, McCaleb & Hinkle
attys.

Patented May 3, 1932

1,856,304

UNITED STATES PATENT OFFICE

ROBERT H. WHITELEY, OF OAK PARK, ILLINOIS, ASSIGNOR TO ROBERT H. WHITELEY, TRUSTEE

SELF-LUBRICATING BEARING

Application filed January 14, 1929. Serial No. 332,391.

The present invention relates to self-lubricating bearings and is particularly concerned with bearings including lubricating members of graphite compound or the like.

In the bearings of the prior art, grooves or recesses have been employed for receiving a filling of lubricating material, but it has generally been necessary to form grooves by a plurality of separate cuts and the grooves of the prior art bearings have been formed by separate cuts which were made by a plurality of separate applications of the cutter. The stopping and starting and resetting of cutters for the purpose of forming discontinuous grooves involves considerable labor and time and increases the cost of manufacture of the finished bearing. The output of bearings which is possible with any given amount of machinery, is also limited by the time required for cutting the grooves in a single bearing and any decrease in the time or labor required for a single bearing, also increases the output with a given amount of machinery.

One of the objects of the present invention is the provision of an improved bearing structure which is more quickly and economically manufactured than the bearings of the prior art and which includes a plurality of reentrant lubricant receiving grooves or recesses which may be very quickly formed by an ordinary grooving machine.

Another object of the invention is the provision of a novel heat responsive bearing including a lubricant reservoir, a bearing surface, one or more lubricant conducting members for carrying lubricant to the bearing surface and a lubricant distributing system for uniformly supplying lubricant to the parts of the bearing surface.

Another object is the provision of an improved self-lubricating bearing structure including a reservoir, lubricant conducting members extending from said reservoir to a bearing surface and a plurality of interconnecting lubricating members embedded in the bearing surface of said bearing for assuring an equal supply of lubricant to the parts of said bearing surface.

Another object is the provision of a novel method of construction of self-lubricating bearings, which is more economical and expeditious and capable of producing an improved bearing structure.

Another object is the provision of an improved self-lubricating bearing including a lubricant reservoir and lubricant dispensing members, in which the lubricant dispensing area may be greatly increased and so distributed as to most effectively lubricate the bearing surface without weakening the bearing structure by an excessive number of apertures or conduits.

Other objects and advantages of the invention will appear more fully from the following description and from the accompanying drawings, in which similar characters of reference indicate similar parts throughout the several views.

Referring to the single sheet of drawings.

Many of the advantages of the invention may be realized by the use of only a part of the structure described, including only the elements having the advantages desired, and it is to be understood that my invention includes in its scope all of the combinations or permutations of the various elements described hereinafter.

Figure 3:
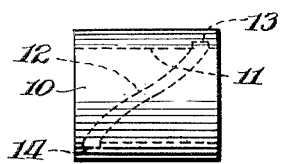
Fig. 3 is an elevational view of a bearing shell having a single lubricant filled and reentrant groove.

Referring to Fig. 3, 10 indicates one of my bearing shells in its entirety and in the present embodiment the bearing shell comprises a substantially cylindrical metal member having an interior cylindrical bearing surface 11 adapted to receive a rotating or sliding part. The bearing shell 10 may be constructed of any desired metal, but is generally made of bronze or similar bearing metal.

Located within the bearing shell 10 and extending diagonally from end to end on the bearing surface is a groove 12 which is formed as a continuous loop extending about the interior of the bearing surface 11.

Figure 5:
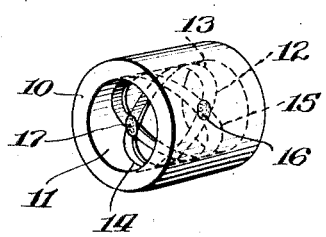
Fig. 5 is a view in perspective of a bearing shell with a pair of reentrant grooves.

Referring to Fig. 5, a similar bearing shell is here shown in perspective and the groove 12 may be similar in form to that shown in Fig. 3. Starting at the top of Figs. 3 and 5, at 13 adjacent one end but spaced slightly from the end of the bearing, the groove 12 may pass downward and diagonally to the left across the rear half of the bearing surface 11 to a point 14 at the bottom of the bearing and adjacent to the opposite end of the bearing. From the point 14 the groove 12 may extend upward and diagonally to the right across the front half of the bearing surface 11 until it joins the beginning of the groove 12 at the point 13 adjacent the top and one end of the bearing.

It will thus be observed that the groove 12 extends diagonally across the cylindrical bearing surface of the bearing at the medial portions and circumferentially of the bearing surface at points adjacent the ends of the bearing, but the entire groove is located within the ends of the bearing and it is adapted to retain a lubricating member of graphite compound or the like without the possibility of any of the compound being worn away at the ends of the bearing as would be the case with longitudinally extending grooves which project out the ends of the bearing. Furthermore, as the groove 12 extends diagonally across the bearing surface throughout the major portion of the length of the groove, a rotating shaft or journal will wipe laterally across the groove so that it will not tend to scrape the compound out of the groove, as is the case where circular grooves are used.

In some embodiments of my invention a single lubricating groove may be employed, while in other embodiments it is preferable to employ a plurality of grooves to increase the area of the lubricating members and distribute them uniformly over the bearing surface. Thus in Fig. 5, two reentrant grooves 12 and 15 have been employed, the grooves extending diagonally from the opposite ends of the bearing and transversely to each other, intersecting each other at 16 and 17. Thus the groove 15 may begin at the top of the bearing shell extending diagonally downward and to the right across the front half of the bearing surface to a point at the bottom of the bearing and adjacent the right end. The groove 15 returns across the rear half of the bearing shell extending diagonally to the left and upward to join the beginning end of the groove.

Figure 2:
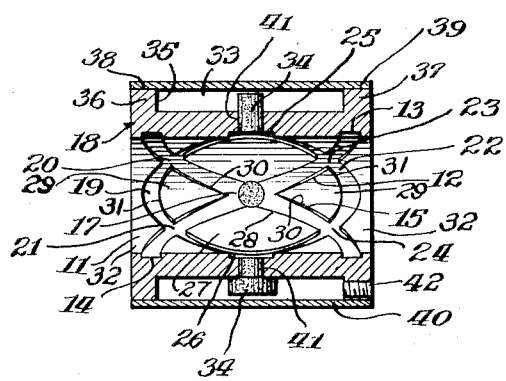
Fig. 2 is a sectional view taken on the line 2—2 of Fig. 1 looking in the direction of the arrows.

Referring to Fig. 2, the modified form of bearing shell 18 has been illustrated with four separate and reentrant grooves similar to the grooves 12 and 15 of Figs. 3 and 5. In the half bearing shell illustrated, the grooves 12 and 15 are shown extending diagonally from the left bottom to the right top and from the left top to right bottom respectively, intersecting at the point 17. The groove 19 comprises a single reentrant loop or groove which extends diagonally from the back of the bearing at the left end to the front of the bearing at the right end intersecting the grooves 15 and 12 at 20 and 21 respectively, and at similar points located on the front half of the bearing at the opposite end. The groove 22 extends from the back of the bearing in Fig. 2 diagonally across the top and bottom to the front of the bearing at the left end, also intersecting grooves 12 and 15 at 23 and 24 and at similar points in the front half of the bearing adjacent the left end.

It should also be noted that the grooves 19 and 22 extend transversely to each other and intersect each other at the points 25 and 26 at the top and bottom of the bearing. In other words, the grooves 19 and 22 may be exactly the same form as the grooves 12 and 15 but they are located at a point which is rotated 90 degrees from the location of the grooves shown in Fig. 5.

It will thus be observed that where a greater area of lubricating surface is desired, a greater number of reentrant grooves may be employed, the loops being located at equally spaced points about the cylindrical bearing surface and the number of loops employed will vary with the size of the bearing used. Where a very large bearing is constructed eight or sixteen loops might be used, the additional loops being located in between the loops illustrated in the present drawing.

The loops or grooves 12, 15, 19 and 22 may be formed on an ordinary grooving machine, and since the grooves are reentrant it is possible to make as many separate cuts in a groove as are desired without any starting or stopping, it being simply necessary to feed the groove cutter inward to make a deeper cut. The shape of the present grooves approximate that of an ellipse, as distinguished from the spiral grooves or grooves of threaded form shown in the prior art and a number of bearing studs of various shapes is formed between the respective grooves. Thus the bearing studs 27 extending down the middle of a four groove bearing are quadrilateral figures having outwardly curved sides 28, while the bearing studs 29 formed adjacent to the middle of the bearing comprise substantially triangular members having two inwardly curved sides 30 and one outwardly curved side 31.

Adjacent each end of the bearing surface is a relatively thin strip 32 of bearing metal which protects the ends of the grooves or loops and prevents the graphite filling from coming out of the end of the bearing.

Figure 4:
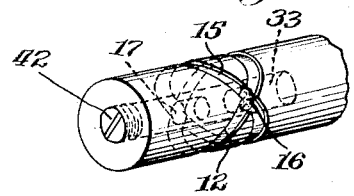
Fig. 4 is a perspective of my self-lubricating bearing as applied to a shaft or journal.

Referring to Fig. 4, it will be observed that an outer cylindrical surface may be formed with reentrant grooves similar in shape to those shown in Fig. 2, and the present invention is not limited to inner cylindrical surfaces but may be used upon outer cylindrical surfaces as well.

The grooves may be undercut, if desired, or otherwise shaped for better retaining the lubricant in the grooves.

Figure 1:
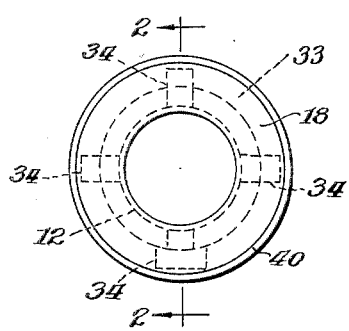
Fig. 1 is an end view of one of my self-lubricating members.

The groove construction which has been described may be employed in bearings of many different types with or without a lubricant reservoir, but in the embodiment shown in Figs. 1 and 2 the bearing is provided with a reservoir 33 adapted to receive a supply of lubricant which is dispensed to the bearing surface by lubricating members 34 over a relatively long period of time. In order to form the reservoir 33 the bearing shell 10 or 18 may be provided with a centrally located circumferentially extending groove 35 on its outer surface between two annular flanges 36 and 37. The flanges 36 and 37 are formed with an accurately machined outer cylindrical surface 38 and 39 adapted to be received in a tubular metal member 40 which may be heated and shrunk on the bearing shell 18 or which may be secured thereon by pressing the tube on with a relatively heavy press. One of the flanges 36 or 37 may be provided with a threaded aperture to be closed with a threaded filling plug or the bearing shell 18 and the tube 40 may be immersed in lubricant during the operation of their assembly, thereby filling the reservoir 33 and permanently closing it.

The lubricant dispensing members 34 comprise plugs of initially plastic graphite compound such as may be purchased in the open market, but I have discovered that this graphite compound may be rendered porous by baking same, thereby giving the lubricating members 34 the property of dispensing lubricant to the bearing surface over a relatively long period of time. The grooves in the bearing surface 11 may be filled with initially plastic graphite compound and the bearing shell may be provided with a plurality of conduits 41 into which the plastic compound may be intruded to form the lubricating members 34. As the plastic compound is intruded into the conduits 41 it is slightly compressed, the compound expanding as it reaches the reservoir 33 so that clinchers may be formed within the reservoir for retaining the lubricating members in place. If desired, lubricating members 34 may be formed with heads inside the reservoir 33.

The conduits 41 are preferably located at the points of intersection of the grooves 12, 15, 19 and 22 so that the lubricant which is dispensed by the lubricating members 34 may be distributed by capillary attraction or otherwise through the porous graphite composition which fills the grooves.

It will be observed that the graphite filled grooves constitute a distributing system for the lubricant which is dispensed by lubricating members 34 and the lubricant is carried by the graphite filled grooves to every portion of the bearing surface. At the same time that portion of the graphite compound in the grooves adjacent the conduits 41 serves to retain the lubricating members 34 in place in the conduit in exactly the same manner as a head formed on the lubricating member 34 and embedded in the bearing surface.

The grooves may be filled with a slight surplus of the graphite compound, if desired, in order to supply an initially protruding graphite filling which may be worn in by the cooperating bearing surface, filling all of the interstices on the bearing surface and forming a glazed bearing surface. After the grooves and conduits have been filled with a lubricating compound, the bearing shell and compound may be subjected to a baking in order to render the initially plastic compound porous and to set the graphite filling in place in the grooves and conduits. The bearing may then be assembled with the complementary tubular member closing the reservoir 33 and filling it with lubricant or the bearing may be filled later through a filling aperture 42.

The operation of my self-lubricating bearing is as follows: When the bearing is first worn in, any initially protruding portion of the plastic compound is employed in filling the interstices of the bearing surface, thereby producing a surface which requires but very little lubrication.

The reservoir 33 having been filled with lubricant, this lubricant is carried by the porous graphite members 34 to the bearing surface 11 and distributed thorugh the graphite filled grooves. The graphite composition, which is porous as previously described, has the peculiar property of dispensing lubricant over a long period of time without any waste and the graphite compound is also adapted to increase the supply of lubricant upon a slight increase of heat at the bearing surface. It is readily noticeable that the lubricant appears at the surface of the graphite members adjacent the bearing surface as soon as the bearing has been heated a small amount, such as takes place when the bearing is held in the hand, and consequently it will be evident that the present construction insures proper lubrication at all times.

If the lubrication should not be sufficient, the bearing would be slightly heated, in which case an increased flow of lubricant will speedily remedy the lack of lubrication.

It should also be noted that my graphite bearing is more easily manufactured than the bearings of the prior art and the reentrant grooves may be constructed with an ordinary grooving machine in a small fraction of time where the grooves begin at one end of the bearing and terminate at the opposite end of the bearing. My self-lubricating bearing is capable of dispensing lubricant over a long period of time without any attention and it may therefore be used in relatively inaccessible points where lubrication is difficult.

While I have illustrated and described specific embodiments of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States is:

1. A self-lubricating bearing comprising a metallic member formed with a bearing surface and having a plurality of re-entrant grooves formed in said bearing surface and extending circumferentially of said bearing and diagonally with respect to the axis of said bearing, each of said re-entrant grooves intercepting a plurality of other similar re-entrant grooves and a filling of porous carbon compound in said grooves, said metallic member being formed with a reservoir and a plurality of conduits leading from said reservoir to the intersections of said grooves.

2. In a self-lubricating bearing, the combination of a supporting body with a meshwork of lubricant dispensing material embedded in the bearing surface of said body, said body having conduits extending through the same and portions of said lubricant dispensing material extending through said conduits and formed with anchoring formations upon the side of said body opposite from said meshwork.

3. In a self-lubricating bearing, the combination of a bearing member having a cylindrical bearing surface, said surface having a plurality of reentrant intersecting grooves, a complementary member adapted to form a reservoir with said bearing member, said bearing member having conduits leading from said reservoir to said grooves, and a porous graphite compound filling said grooves and conduits.

4. A method of constructing self-lubricating bearings comprising forming substantially elliptical grooves in a bearing surface filling said grooves with initially plastic graphite compound and baking said compound to a porous condition.

5. A self-lubricating bearing comprising a metallic member formed with a bearing surface and having a plurality of re-entrant grooves formed in said bearing surface and extending circumferentially of said bearing and diagonally with respect to the axis of said bearing, each of said re-entrant grooves intercepting a plurality of other similar re-entrant grooves, a filling of porous graphite lubricating compound in said grooves, said metallic member being formed with a reservoir and a plurality of conduits leading from said reservoir to the intersections of said grooves, and a plurality of graphite compound lubricant conducting members located in said conduits and extending from said reservoir to the intersections of said grooves.

6. A self-lubricating bearing comprising a cylindrical metal member forming a trunnion, said trunnion having a reservoir formed therein and having an outer cylindrical surface, a plurality of re-entrant grooves formed in said outer cylindrical surface and extending circumferentially of the bearing and diagonally with respect to the axis of the bearing, each of said re-entrant grooves intersecting a plurality of other similar re-entrant grooves, said bearing having conduits leading from said reservoir to said grooves, and porous graphite compound in said conduits and said grooves for conducting lubricant from said reservoir and distributing lubricant over said trunnion.

7. A self-lubricating bearing comprising a cylindrical metal member having a bore passing through the same and having radially extending flanges at each end, the inner cylindrical surface of said bore being formed with a plurality of re-entrant grooves extending circumferentially of said bearing and diagonally with respect to the axis of said bearing, each of said grooves intersecting a plurality of other similar re-entrant grooves, said bearing having conduits extending from the outside of said bearing to the inside of said bearing, and a porous graphite compound in said grooves and conduits.

8. A self-lubricating bearing comprising a cylindrical metal member having a bore passing through the same and having radially extending flanges at each end, the inner cylindrical surface of said bore being formed with a plurality of re-entrant grooves extending circumferentially of said bearing and diagonally with respect to the axis of said bearing, each of said grooves intersecting a plurality of other similar re-entrant grooves, said bearing having conduits extending from the outside of said bearing to the inside of said bearing, a porous graphite compound in said grooves and conduits, and a sheet metal sleeve closely fitted on said radially extending flanges for forming an annular reservoir about said bearing communicating with said conduits.

9. A shaft having a bore extending into one end of the same and having a closure for the open end of said bore, a plurality of re-entrant grooves arranged on the outer surface of said shaft, said re-entrant grooves extending circumferentially of said shaft, and diagonally with respect to the axis of said shaft and each of said re-entrant grooves intersecting another similar re-entrant groove, said shaft having a conduit leading from said bore to said grooves and a filling of porous graphite compound in said conduit and grooves.

In witness whereof, I hereunto subscribe my name this 10th day of January, 1929.

ROBERT H. WHITELEY.